Dec. 5, 1961 R. G. GATES 3,011,798
TURN TABLE FOR LOG TRUCK BUNKS
Filed Feb. 8, 1960 2 Sheets-Sheet 1
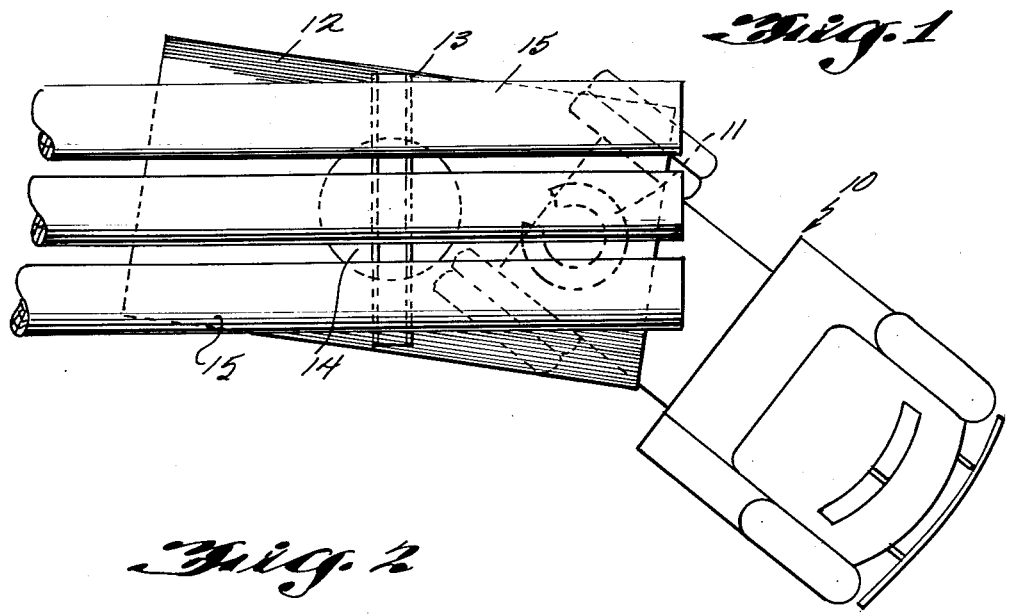
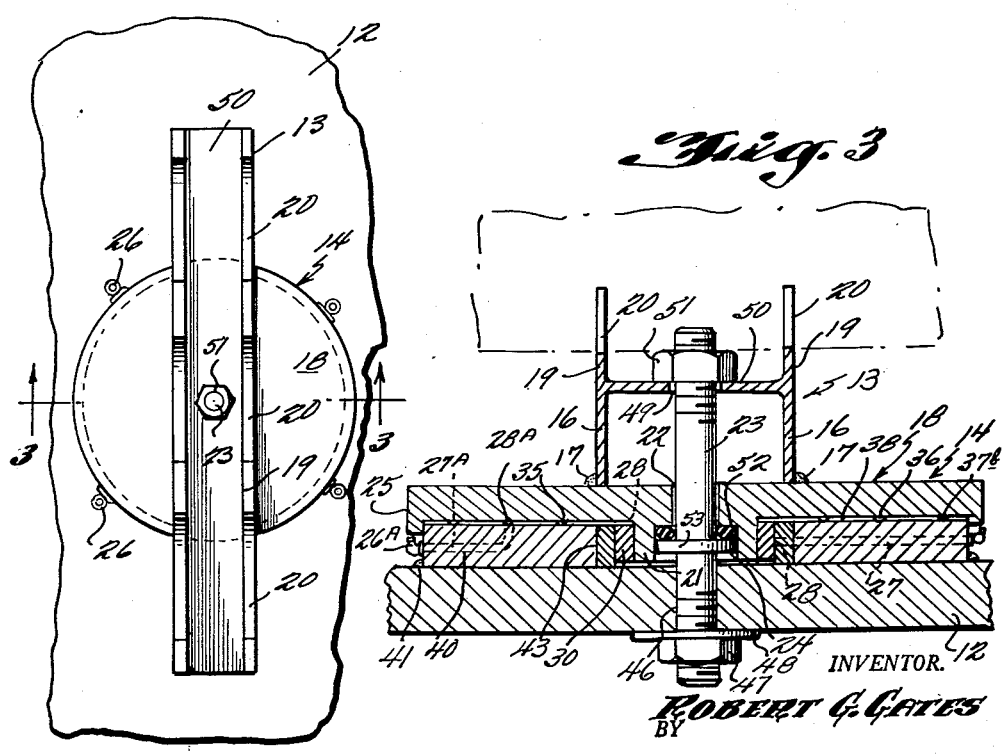
INVENTOR.
ROBERT G. GATES
BY
Kimmel & Crowell
ATTORNEYS Dec. 5, 1961 R. G. GATES 3,011,798
TURN TABLE FOR LOG TRUCK BUNKS
Filed Feb. 8, 1960 2 Sheets-Sheet 2
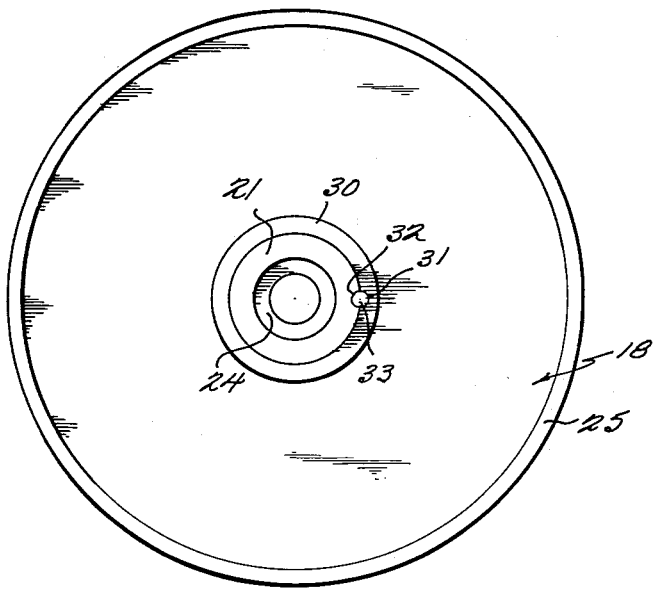
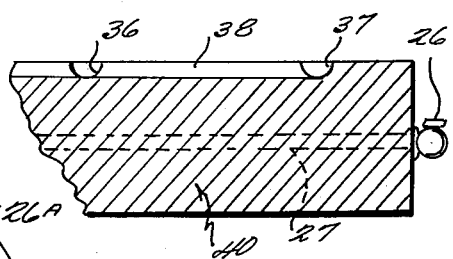
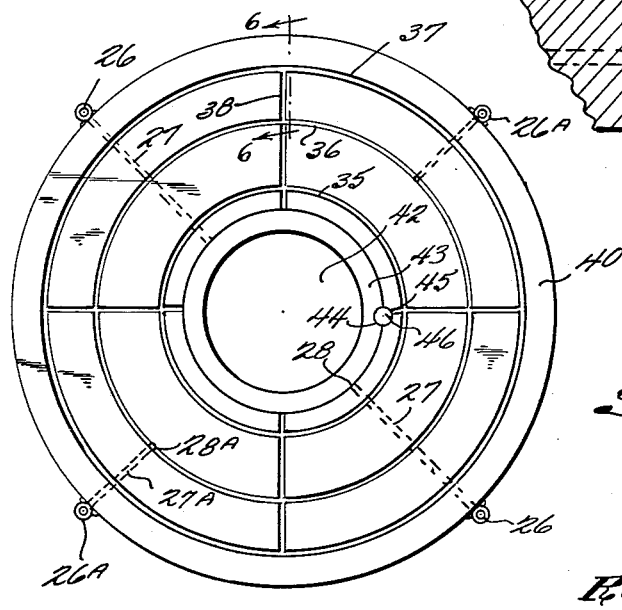
INVENTOR.
ROBERT G. GATES
BY
Kimmel & Crowell
ATTORNEYS

United States Patent Office 3,011,798
Patented Dec. 5, 1961

3,011,798
TURN TABLE FOR LOG TRUCK BUNKS
Robert G. Gates, R.F.D. 4, Box 350A, Corvallis, Oreg.
Filed Feb. 8, 1960, Ser. No. 7,416
3 Claims. (Cl. 280—404)

This invention relates to a turn table, and although it is hereinafter described as having particular applicability to a log truck bunk, it will be readily understood that the same may be applied to other vehicles or devices wherein a turn table is desirable, such as for example the fifth wheel of a conventional tractor and trailer arrangement.

A primary object of this invention is the provision of an improved turn table comprised of upper and lower plate members provided with interfitting wear rings, which, when worn, can be readily replaced in order to avoid the necessity of replacement of an entire plate or turn table assembly.

A further object of the invention is the provision of a turn table of this character which may be readily disassembled to provide access to the rings for removal and replacement, as desired.

A more specific object of the invention is the provision of such a turn table which wherein the rings themselves may be readily and substantially instantaneously removed and replaced.

An additional object of the invention is the provision of such a turn table characterized by improved lubricating means for the assembly.

Still another object of the invention is the provision of a turn table of this character which is sturdy and durable in construction, reliable and efficient in operation, and relatively simple and inexpensive to manufacture, assemble, and utilize.

Still other objects reside in the combinations of elements, arrangements of parts, and features of construction, all as will be more fully pointed out hereinafter and shown in the accompanying drawings wherein:

FIGURE 1 is a top plan view, partially schematic of a truck and log trailer, the latter carrying a log bunk mounted on the turn table of the instant invention;

FIGURE 2 is an enlarged top plan view of one log bunk and its associated turn table;

FIGURE 3 is an enlarged sectional view taken substantially along the line 3—3 of FIGURE 2, as viewed in the direction indicated by the arrows;

FIGURE 4 is an enlarged bottom plan view of the top plate of the turn table of the instant invention;

FIGURE 5 is an enlarged top plan view of the bottom plate of the turn table of the instant invention; and FIGURE 6 is an enlarged fragmentary detailed sectional view taken substantially along the line 6—6 of FIGURE 5, as viewed in the direction indicated by the arrows.

Similar reference characters refer to similar parts throughout the several views of the drawings.

Having reference now to the drawings in detail, and more particularly to FIGURE 1, there is generally indicated at 10 a tractor vehicle of any desired conventional type provided with a fifth wheel 11 to which is secured in conventional manner a log truck trailer 12. The trailer 12 has rotatably mounted thereon a log bunk 13, which is mounted on the turn table 14, which comprises an element of the instant invention. Logs 15 are carried by the bunk in conventional manner, and the rear ends of the logs 15 are supported on a similar bunk carried by a second log trailer (not shown). With the exception of the turn table 14, all of the matter hereinbefore described is largely conventional in the art of transporting logs by truck.

Referring now to FIGURES 2 and 3, the bunk 13 is comprised of a suitable length of H-beam material the lower flanges 16 of which are suitably secured as by welding 17 to the top plate, generally indicated at 18, of the turn table 14. The upper flanges 19 of the bunk are provided with suitable aligned recessed portions 20 which provide supports for the logs 15.

As best shown in FIGURE 4, upper plate 18 is of circular configuration and includes a central hub 21, which is provided with a bore 22 through which a center pin 23 extends, and a lower recess 24 of greater diameter than the bore 22. Plate 18 also includes a depending annular rim 25.

A circular wear ring 30 closely surrounds the hub 21, and is provided at one point in its periphery with a groove 31, which is adapted to be aligned with a groove 32 in the hub. A dowel or key 33 engages the aligned openings 31 and 32 and prevents slippage of the wear ring 30 relative to the hub 21.

Upper plate 18 is rotatably mounted on a lower plate 40, which is secured as by welding 41 to the trailer bed 12.

The lower plate 40 is provided with a relatively large central opening 42, which is surrounded by a wear ring 43, of a dimension closely to engage about the outer periphery of wear ring 30. The wear ring 43 is provided with a vertical groove 44 which is adapted to be aligned with a vertical groove 45 on the inner rim of the opening 42 and a dowel or key 46 engaging in the grooves prevents relative rotation of the wear ring 43 and the lower plate 40.

Lower plate 40 is provided with grease fittings 26 and 26A which communicate with bores 27 and 27A, respectively, which extend interiorly of the plate.

Bores 27 terminate in openings 28 immediately adjacent the juncture of the wear rings.

The upper face of plate 40 is provided with concentric annular oil grooves 35, 36 and 37, which are connected by radial grooves 38, so that oil from the fittings 26 and 26A passing through the bores 27 and the openings 28 after impregnating the wear rings 30 and 43 may be carried through the grooves 35, 36, 37 and 38 to all parts of the upper surface of lower plate 18.

Bores 27A terminate in openings 28A in groove 36.

Lubricant passing through the above-mentioned grooves thus tends thoroughly to lubricate the frictionally engaging surfaces of upper plate 18 and lower plate 40.

Center pin 23 extends through a suitable opening 46 in the trailer bed 12, and is provided at its lower threaded end with a nut 47, which impinges against a washer 48, the nut 47 being employed for adjustment of the center pin.

The upper end of center pin 23 extends through a suitable opening 49 in the web 50 of bunk 13 and is engaged by a nut 51.

An O-ring or sealing gasket 52 is positioned in the recess 24, and is engaged on its underside by a ring 53 which is suitably welded or otherwise secured to the center pin 23, the arrangement being such that when the nut 51 is tightened the flange 53 compresses the O-ring 52 effectively to seal the bore 22 against the ingress of dirt or the like.

In the use and operation of the device, it will be readily apparent that all wear except for surface friction between the lubricated upper face of the lower plate 40 and the under face of upper plate 18 will be borne by the confronting wear rings 30 and 43. These rings are constructed of any desired material subject to impregnation by lubricant from the openings 28, and serve to reduce friction to a minimum. When either of the rings 43 or 30, or both, shows any signs of wear it will be understood that by removing the nut 47 the upper plate 18 and its associated bunk may be removed from the lower plate 40, and either ring 30 or 43, or both, may be readily replaced by a similar ring as necessary or desirable.

From the foregoing, it will now be seen that there is herein provided an improved turn table which has particularly applicability to the bunks of log trucks and trailers, which accomplishes all of the objects of this invention, and others, including many advantages of great practical utility and commercial importance.

It will be understood that the invention contemplates, under certain conditions, the use of a ball or roller bearings in place of the interfitting wear rings.

As many embodiments may be made of this inventive concept, and as many modifications may be made in the embodiment hereinbefore shown and described, it is to be understood that all matter herein is to be interpreted merely as illustrative and not in a limiting sense.

I claim:

1. In a turn table, the combination of a base, a lower plate secured to said base, an upper plate supported on said lower plate, said upper and lower plates being arranged in confronting relation, a center pin extending through said upper and lower plates, a hub carried by said upper plate rotatable on said center pin, a first replaceable wear ring surrounding said hub, said lower plate having a central opening therein, a second removable wear ring in said opening in contact with and rotatable about said first wear ring, means securing said first wear ring against rotation relative to said hub, means securing said second wear ring against rotation in said opening, lubricant fittings on said lower plate, and passages extending from said fittings to a point adjacent said wear rings, said center pin including seal means sealing the pin to the upper plate.

2. In a turn table, the combination of a base, a lower plate secured to said base, an upper plate supported on said lower plate, said upper and lower plates being arranged in confronting relation, a center pin extending through said upper and lower plates, a hub carried by said upper plate rotatable on said center pin, a first replaceable wear ring surrounding said hub, said lower plate having a central opening therein, a second removable wear ring in said opening in contact with and rotatable about said first wear ring, means securing said first wear ring against rotation relative to said hub, means securing said second wear ring against rotation in said opening, lubricant fittings on said lower plate, a passage extending from one of said fittings to a point between said wear rings, and lubricant grooves on the confronting face of one of said plates and communicated with another fitting.

3. In combination with a log bunk having a log receiving member, a turn table comprising a base, a lower plate secured to said base, an upper plate supported on said lower plate and secured to said member, said upper and lower plates being arranged in confronting relation, a center pin extending through said upper and lower plates, a hub carried by said upper plate rotatable on said center pin, a first replaceable wear ring surrounding said hub, said lower plate having a central opening therein, a second removable wear ring in said opening in radial contact with and rotatable about said first wear ring, means securing said first wear ring against rotation relative to said hub, means securing said second wear ring against rotation in said opening, lubricant fittings on said lower plate, a passage extending from one of said fittings to a point between said wear rings, and lubricant grooves on the confronting face of one of said plates, said grooves being arranged radially and angularly and communicating with each other, and a passage communicated with one of said grooves and another fitting.

References Cited in the file of this patent

UNITED STATES PATENTS

| | | |
|---|---|---|
| 548,957 | Clark | Oct. 29, 1895 |
| 2,007,041 | Dorsey | July 2, 1935 |
| 2,285,784 | Scott | June 9, 1942 |
| 2,508,610 | Kendall | May 23, 1950 |

OTHER REFERENCES

Maleev: "Machine Design" (Textbook), copyright 1939 by the International Textbook Co. Pages 136 and 137.